US012694565B2

(12) United States Patent (10) Patent No.: US 12,694,565 B2
Erdei et al. (45) Date of Patent: Jul. 28, 2026

(54) METHOD AND SYSTEM FOR CALIBRATING AT LEAST ONE VEHICLE SENSOR SITUATED IN A VEHICLE

(71) Applicant: Robert Bosch GmbH, Stuttgart (DE)

(72) Inventors: Bence Erdei, Vecsés (HU); Reydan Salem, Budapest (HU); Diego Mainardi, Parma (IT); Reiner Leikert, Munich (DE); Robert Bednarik, Budapest (HU)

(73) Assignee: ROBERT BOSCH GMBH, Stuttgart (DE)

( * ) Notice: Subject to any disclaimer, the term of this patent is extended or adjusted under 35 U.S.C. 154(b) by 310 days.

(21) Appl. No.: 18/263,585

(22) PCT Filed: Feb. 18, 2022

(86) PCT No.: PCT/EP2022/054130
§ 371 (c)(1),
(2) Date: Jul. 31, 2023

(87) PCT Pub. No.: WO2022/184475
PCT Pub. Date: Sep. 9, 2022

(65) Prior Publication Data
US 2024/0412413 A1 Dec. 12, 2024

(30) Foreign Application Priority Data

Mar. 1, 2021 (DE) ..................... 10 2021 201 923.4

(51) Int. Cl.
*G06T 7/80* (2017.01)
(52) U.S. Cl.
CPC ...... *G06T 7/80* (2017.01); *G06T 2207/30252* (2013.01)
(58) Field of Classification Search
CPC ........................ G06T 7/80; G06T 2207/30252
(Continued)

(56) References Cited

U.S. PATENT DOCUMENTS 11,062,478 B2 * 7/2021 Lasaruk ................... G06T 7/80
2009/0299684 A1 * 12/2009 Imanishi .............. H04N 17/002
702/150
(Continued)

FOREIGN PATENT DOCUMENTS

DE 102009001742 A1 9/2010
DE 102010062696 A1 6/2012
(Continued)

OTHER PUBLICATIONS

International Search Report for PCT/EP2022/054130, Issued Jul. 19, 2022.

*Primary Examiner* — Peter J Macchiarolo
*Assistant Examiner* — John M Royston
(74) *Attorney, Agent, or Firm* — NORTON ROSE FULBRIGHT US LLP

(57) ABSTRACT

A method for calibrating at least one vehicle sensor situated in a vehicle. The method includes: providing the vehicle in a calibration space; detecting a vehicle position in a space-fixed coordinate system using an optical detection system situated in the calibration space; ascertaining a position of the relevant vehicle sensor in the fixed coordinate system; situating a calibration object in a detection field of the relevant vehicle sensor in the calibration space; detecting a calibration object position in the space-fixed coordinate system using the optical detection system; transforming the calibration object position into an estimated vehicle sensor-fixed coordinate system to obtain a first relative position; detecting the position of the calibration object using the vehicle sensor in the vehicle sensor-fixed coordinate system as the second relative position; calculating intrinsic and/or extrinsic calibration parameters from a comparison between the first relative position and the second relative position.

9 Claims, 2 Drawing Sheets

(58) Field of Classification Search
USPC .......................................................... 73/1.01
See application file for complete search history.

(56) References Cited

U.S. PATENT DOCUMENTS

| | | | |
|---|---|---|---|
| 2018/0058882 | A1 | 3/2018 | Hodohara et al. |
| 2020/0105018 | A1 | 4/2020 | Corghi |

FOREIGN PATENT DOCUMENTS

| | | | | |
|---|---|---|---|---|
| DE | 102018106464 | A1 | 9/2019 | |
| DE | 102018216104 | A1 | 3/2020 | |
| DE | 102019220049 | A1 | 6/2021 | |
| EP | 1399710 | B1 | 8/2006 | |
| EP | 3621037 | A1 | 3/2020 | |
| EP | 3751519 | A1 | 12/2020 | |
| WO | WO-2019179575 | A1 * | 9/2019 | ............. G01C 11/00 |

* cited by examiner

Fig. 2

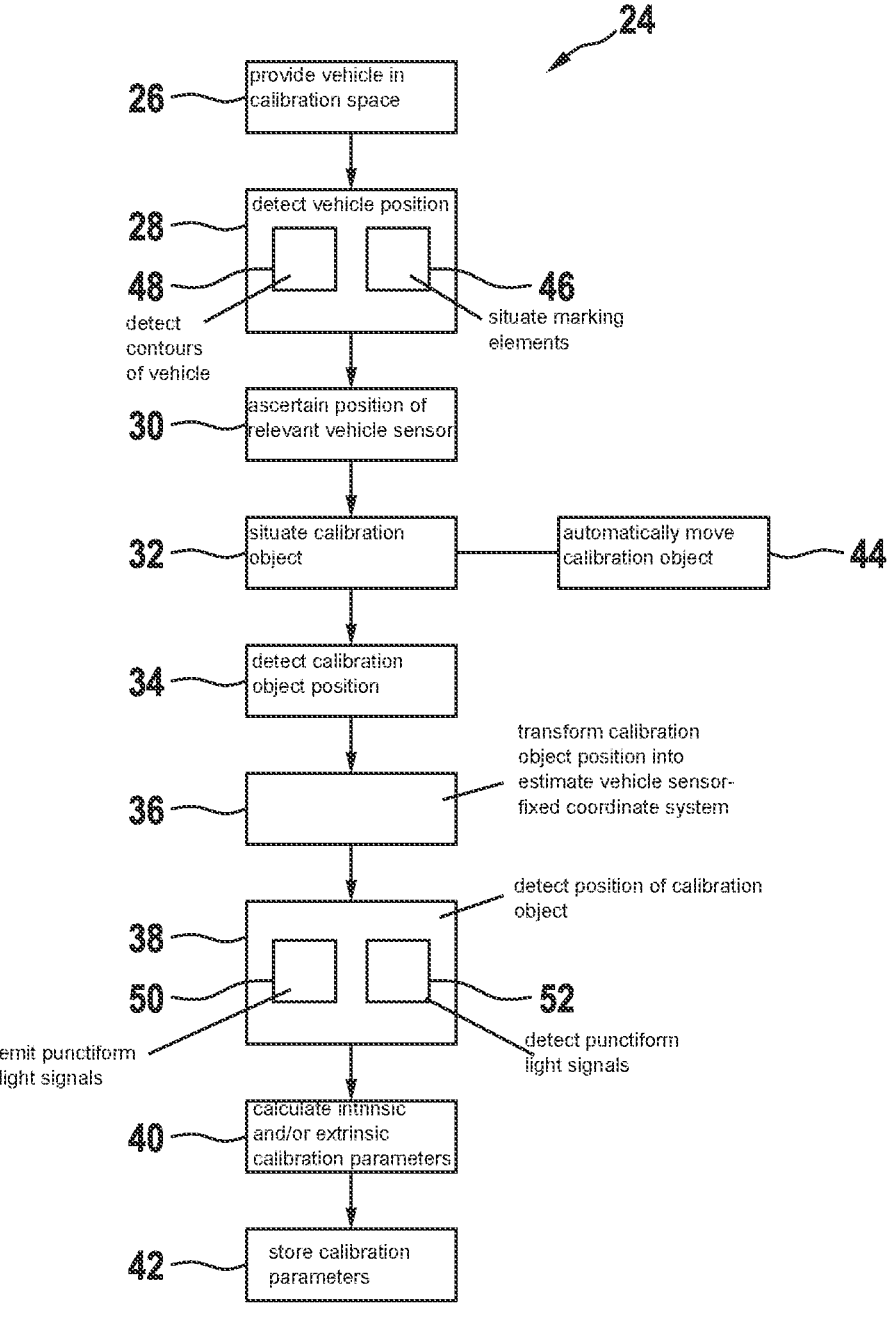

24

26 — provide vehicle in calibration space

28 — detect vehicle position

48 — detect contours of vehicle

46 — situate marking elements

30 — ascertain position of relevant vehicle sensor

32 — situate calibration object

44 — automatically move calibration object

34 — detect calibration object position

36 — transform calibration object position into estimate vehicle sensor-fixed coordinate system 38 — detect position of calibration object 50 — emit punctiform light signals 52 — detect punctiform light signals 40 — calculate intrinsic and/or extrinsic calibration parameters 42 — store calibration parameters

METHOD AND SYSTEM FOR CALIBRATING AT LEAST ONE VEHICLE SENSOR SITUATED IN A VEHICLE

FIELD

The present invention relates to a method and a system for calibrating at least one vehicle sensor situated in a vehicle.

BACKGROUND INFORMATION

Modern motor vehicles often include an array of sensors which assist the driver in recognizing the surroundings. For example, the use of cameras, a radar system, a LIDAR system, distance sensors, or the like is conventional, which are associated with a driver assistance system. It is customary for sensors to be calibrated having a more or less strongly directed detection area in order to ensure a correct function. The calibration may take place both during the final assembly or shortly before delivery of the vehicle, and also during the repair or maintenance of the vehicle.

Calibrating such directed sensors of a vehicle in that a calibration device is positioned in a fixed alignment in relation to the vehicle to which the sensor is attached, the behavior of the sensor is checked, and thereafter the sensor is realigned—in the case of a deviation from expected behavior, is conventional. It is necessary in the calibration process to place the reference object very precisely in order to achieve a reproducible, accurate result. The arrangement of the reference object is typically preset for a specific vehicle sensor.

SUMMARY

It is an object of the present invention to provide an improved method for calibrating at least one vehicle sensor, in which differently positioned vehicle sensors may be calibrated flexibly and nonetheless reproducibly and precisely.

The object may be achieved by a method having features of the present invention. Advantageous example embodiments and refinements of the present invention may be inferred from the disclosure herein.

A method for calibrating at least one vehicle sensor situated in a vehicle is provided. According to an example embodiment of the present invention, the method includes the steps of providing the vehicle in a calibration space, detecting a vehicle position in a space-fixed coordinate system with the aid of an optical detection system situated in the calibration space, ascertaining a position of the relevant vehicle sensor in the fixed coordinate system, situating a calibration object in a detection field of the relevant vehicle sensor in the calibration space, detecting a calibration object position in the space-fixed coordinate system with the aid of the optical detection system, transforming the calibration object position into an estimated vehicle sensor-fixed coordinate system to obtain a first relative position, detecting the position of the calibration object by way of the vehicle sensor in the vehicle sensor-fixed coordinate system as the second relative position, calculating intrinsic and/or extrinsic calibration parameters from a comparison between the first relative position and the second relative position, and storing the calibration parameters in the relevant vehicle sensor and/or an electronics unit coupled to the relevant vehicle sensor.

The calibration space is to be viewed as a three-dimensionally delimited area, the dimensioning of which is sufficient to place reference objects at predefined relative positions in relation to the vehicle sensors to calibrated vehicle sensors of a vehicle situated in the calibration space. A space-fixed coordinate system is provided in the calibration space, which includes a fixed alignment. At the beginning of the method according to the present invention, the vehicle is situated in the calibration space. The position of the vehicle is not always the same, but may be different for each vehicle situated therein.

A vehicle-fixed coordinate system is a Cartesian, right-handed coordinate system, which has its origin, for example, in a center point of the rear axle of the vehicle. The alignment of the vehicle may be ascertained by the location of the origin of the vehicle-fixed coordinate system in the space-fixed coordinate system and three orientation angles, i.e., the Euler angles. These are known as the yaw angle, pitch or inclination angle, and roll angle.

The vehicle sensor-fixed coordinate system is rigidly coupled to the vehicle-fixed coordinate system, the actual position of the origin of the vehicle sensor-fixed coordinate system and the alignment in relation to the vehicle-fixed coordinate system being able to differ from vehicle sensor to vehicle sensor due to deviations related to manufacturing and installation. The vehicle sensor-fixed coordinate system is primarily defined by the detection direction and a position of an effective sensor surface.

According to an example embodiment of the present invention, the vehicle sensor may in particular be a camera, which is situated at the vehicle and has a detection area facing away from the vehicle. This could be a front camera behind a windshield, a rearview camera, or a camera at another installation position, and may also be associated with a 360° camera system.

According to an example embodiment of the present invention, the optical detection units may be situated as required at various points within the calibration space and have known positions in the space-fixed coordinate system. They are coupled with a processor unit which is made capable by data from the optical detection of the vehicle of ascertaining the location of the vehicle.

The ascertainment of the position of the relevant vehicle sensor may be retrieved, for example, by retrieving an installation position from a memory unit, in order to then transform it into the space-fixed coordinate system. The installation positions originate, for example, from a CAD system, which includes data representing the structure of the vehicle. Since the relationship between the vehicle-fixed coordinate system and the space-fixed coordinate system is known on the basis of the detection of the vehicle position, installation positions at the vehicle in the space may be determined very easily. In this way, an estimation of the vehicle sensor-fixed coordinate system is achievable.

According to an example embodiment of the present invention, the optical detection system in the calibration space may furthermore, in addition to the position and alignment of the vehicle, also detect the position and alignment of the calibration object. The relative position between the vehicle sensor and the calibration object is ascertainable by the transformation of this detected position into the vehicle-fixed coordinate system. This is called the first relative position.

The calibration object is a device which is situated at a distance to the vehicle sensor in its detection area and may therefore be detected by the vehicle sensor. The calibration object is preferably optically unambiguously recognizable. For example, the calibration object could be designed as a flag, sign, or panel and could be provided with a marking.

The marking could be formed as a pattern which makes at least one specific point on the calibration object recognizable. The calibration object is particularly preferably designed so that a pattern is situated thereon which makes a spatial alignment of the calibration object recognizable. This may include, for example, a grid structure or a chessboard structure, which is situated on a flat main body. Depending on the alignment of the flat main body in relation to the vehicle sensor, for example a camera, a perspective distortion is recognizable from which an alignment may be ascertained. The distance may be detected from the size of the grid or the fields on the calibration object. The second relative position thus results overall.

With an ideally aligned vehicle sensor, the first and second relative position correspond. However, this is not to be assumed in most cases after new installation or replacement. Intrinsic and/or extrinsic calibration parameters may be computed from the existing difference between the two relative positions. In the intrinsic calibration of the vehicle sensor, a match is created between a two-dimensional image, processed by the camera, from the viewpoint of the vehicle sensor-fixed coordinate system and the real three-dimensional world. The intrinsic calibration parameters represent a projective transformation of the three-dimensional coordinates of the vehicle sensor into the two-dimensional image coordinates. Meanwhile, in the extrinsic calibration of the vehicle sensor, a mechanical adaptation of the position of the vehicle sensor to the desired direction in the vehicle-fixed coordinate system may take place. The extrinsic calibration parameters may, however, also be stored as present six-dimensional coordinates of the vehicle sensor in the vehicle-fixed coordinate system. The extrinsic parameters represent a rigid transformation of the three-dimensional, space-fixed coordinate system into the vehicle sensor-fixed coordinate system fixedly situated coordinate system of the vehicle sensor.

The method according to the present invention may therefore carry out reproducibly and precisely a calibration of vehicle sensors, which are situated arbitrarily at the relevant vehicle.

In one advantageous specific embodiment of the present invention, the method may furthermore include automatically moving the calibration object into a predefined relative position in relation to the relevant vehicle sensor. The predefined relative position may in particular be a predefined relative position with respect to the estimated vehicle sensor-fixed coordinate system. Since the calibration object is to be placed in the detection area, the rough arrangement of the calibration object may already be sufficient for the calibration.

In a further advantageous specific embodiment of the present invention, the detection of the vehicle position includes situating marking elements at predetermined positions of the vehicle, wherein the marking elements are identifiable by the optical detection system. The marking elements may be devices which are positionable at the relevant vehicle and are optically unambiguously recognizable. They could also be designed as flags, signs, or plates which are provided with a marking. This could be designed as a pattern which makes at least one specific point on the marking element recognizable. The marking could include a flat structure, so that the spatial alignment of the marking elements is recognizable, for example, by recognizing a perspective distortion.

The detection of the vehicle position could include the detection of contours of the vehicle which are identified on the basis of geometric data of the vehicle. These could include concise contours such as those of wheels, wheel guards, or other components.

In one advantageous specific embodiment of the present invention, the detection of the position of the calibration object by the vehicle sensor in the vehicle sensor-fixed coordinate system furthermore includes emitting a punctiform light signal from the calibration object, detecting the punctiform light signal, and ascertaining a distance and/or direction of the calibration object. The punctiform light signal could, for example, be situated centrally at the calibration object and permit an unambiguous identification of a specific point of the calibration object. The detection of the position of the calibration object may thus be supported.

According to an example embodiment of the present invention, the method preferably furthermore includes, after calibrating a first vehicle sensor, automatically moving the calibration object into a predefined relative position for at least one following vehicle sensor and carrying out a calibration of the at least one following vehicle sensor. The method may therefore calibrate various vehicle sensors fully automatically in succession.

Similarly thereto, the present invention relates to a system for calibrating at least one vehicle sensor situated in a vehicle. According to an example embodiment of the present invention, the system includes a calibration space, a calibration object, and a space-fixed optical detection system, situated in the calibration space, including at least one optical detection unit and a processor unit which may be coupled thereto, the processor unit being designed to ascertain the vehicle position of a vehicle in a space-fixed coordinate system with the aid of the optical detection system situated in the calibration space, to ascertain a position of the relevant vehicle sensor in the space-fixed coordinate system, to detect a calibration object position of the calibration object situated in a detection field of the relevant vehicle sensor in the space-fixed coordinate system with the aid of the optical detection system, to transform the calibration object position into an estimated vehicle sensor-fixed coordinate system to obtain a first relative position, to calculate intrinsic and/or extrinsic calibration parameters from a comparison between the first relative position and a second relative position, the second relative position being ascertained by the vehicle sensor in the vehicle sensor-fixed coordinate system, and to store the calibration parameters in the relevant vehicle sensor and/or an electronics unit coupled to the relevant vehicle sensor.

In one advantageous specific embodiment of the present invention, the system furthermore includes a movement device for holding and moving the calibration object at a predefined position in the calibration space.

The calibration object could, as described above, furthermore include a punctiform light source for emitting a punctiform light signal, for ascertaining a distance and/or direction of the calibration object from the relevant vehicle sensor.

In one advantageous specific embodiment of the present invention, the processor unit could be designed to identify marking elements at predetermined positions of the vehicle or contours of the vehicle to detect the vehicle position.

The movement device could include at least one rail, at which the calibration object is held movably. The rail may be moved in the calibration space. A holder, which holds the calibration object, may be movably held on the rail. The holder may also be an actuator which moves the calibration object perpendicularly to the rail holding it. The actuator or the holder could be held displaceably along the rail. The calibration object may therefore preferably be movable in three spatial directions.

Further measures improving the present invention will be described in more detail hereinafter jointly with the description of the preferred exemplary embodiments of the present invention on the basis of figures.

BRIEF DESCRIPTION OF THE DRAWINGS

FIG. 2 shows a schematic representation of a method according to an example embodiment of the present invention.

DETAILED DESCRIPTION OF EXAMPLE EMBODIMENTS

Figure 1:
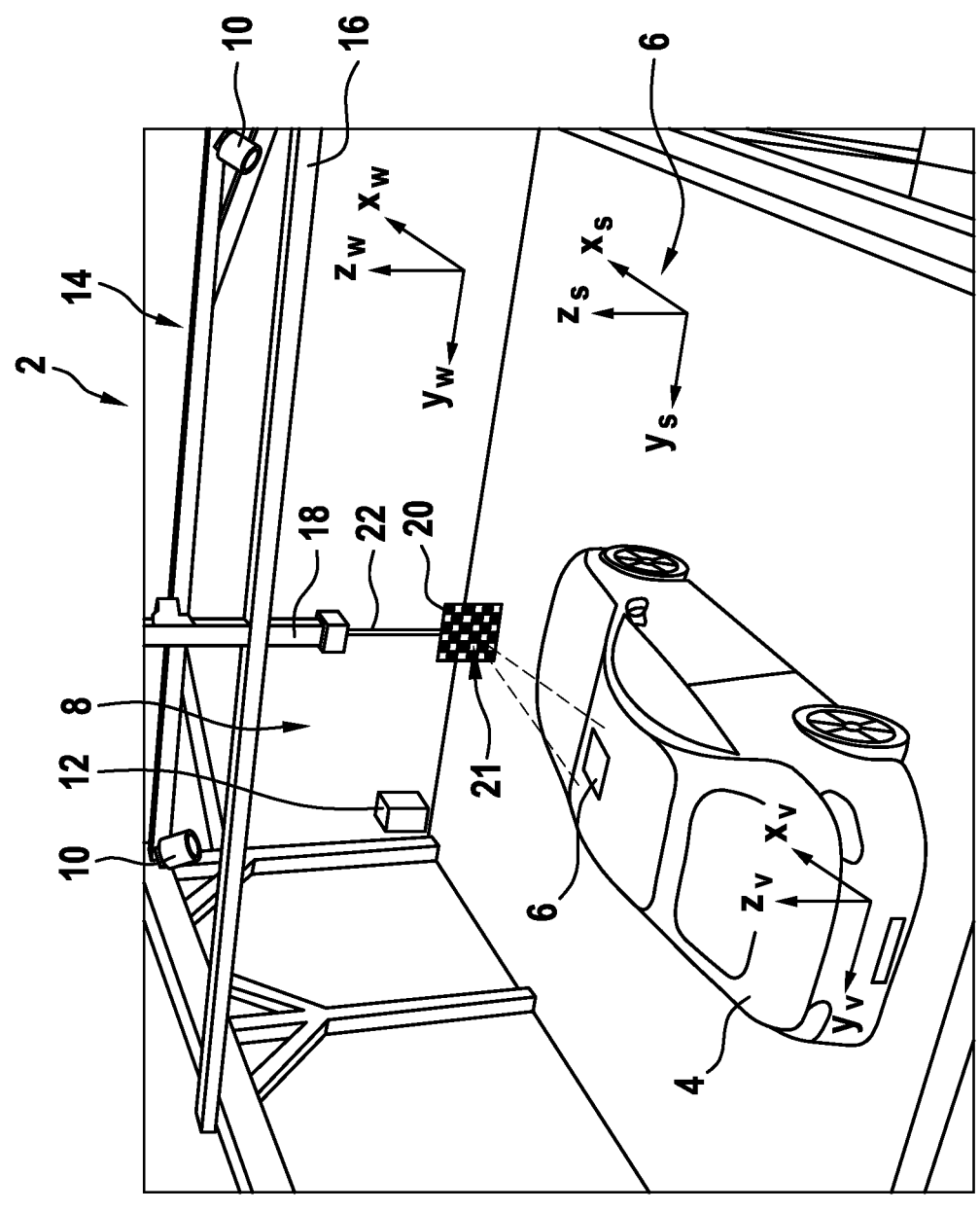
FIG. 1 shows a three-dimensional view of a system according to an example embodiment of the present invention.

FIG. 1 shows a system 2 for calibrating at least one vehicle sensor 6 situated in a vehicle 4. Vehicle sensor 6 may be a camera in this case, which is situated behind the windshield and is directed forward. A calibration space 8 is provided, in which vehicle 4 is situated for calibration. A space-fixed coordinate system $(x_w/y_w, z_w)$ is formed in calibration space 8. Vehicle 4 includes a vehicle-fixed coordinate system $(x_v, y_v, z_v)$, the position of which is dependent on the location of vehicle 4 in calibration space 8. The origin could be located, for example, in a rear axle of vehicle 4. Vehicle sensor 6 includes a vehicle sensor-fixed coordinate system $(x_s, y_s, z_s)$, the location and alignment of which are determined by the installation position at vehicle 4 and the alignment of vehicle sensor 6.

A space-fixed optical detection system including multiple detection units 10, which are spaced apart from one another and are situated, for example, at different corners of calibration space 8, is provided. These are connected to a processor unit 12.

A movement device 14 is provided, which includes a rail 16 at which an actuator 18 situated extending vertically, i.e., along the $z_w$ axis, is mounted. Rail 16 may be moved in longitudinal direction $x_w$ along calibration space 8. Actuator 18 is mounted movably along transverse direction $y_w$ at rail 16. It carries a calibration object 20, which is movable by moving a linear drive 22 in the vertical $(z_w$ axis). Calibration object 20 may therefore be moved in calibration space 8 by movement device 14 to an arbitrary predefined position.

Calibration object 20 is designed as a plate-shaped formation, which includes a chessboard pattern, for example. Upon detection of a two-dimensional image of the calibration object, a distance and alignment may be ascertained based on the size of the individual fields of the chessboard pattern and the distortion. Moreover, calibration object 20 includes a punctiform light source 21 by way of example. This may emit a punctiform light signal, which is unambiguously identifiable. The distance and/or direction of calibration object 20 may be recognized therefrom or the detection of the position of calibration object 20 by vehicle sensor 6 may be supported.

Processor unit 12 is designed by way of example to ascertain a vehicle position of vehicle 4 in the space-fixed coordinate system with the aid of the optical detection system situated in calibration space 8. Furthermore, a position of relevant vehicle sensor 6 in the space-fixed coordinate system may be ascertained therefrom. Processor unit 12 may furthermore detect the calibration object position of calibration object 20 situated in a detection field of vehicle sensor 6 in the space-fixed coordinate system with the aid of the optical detection system. On the basis of the knowledge of the geometry of vehicle 4 and its detected location, furthermore the vehicle sensor-fixed coordinate system may be estimated and processor unit 12 may transform the calibration object position into the estimated vehicle sensor-fixed coordinate system to obtain a first relative position. Vehicle sensor 6 may also detect calibration object 20 and ascertain a relative position, which is called the second relative position here, therefrom. It is possible therefrom to calculate intrinsic and/or extrinsic calibration parameters from a comparison between the first relative position and the second relative position. The calibration parameters are then stored in relevant vehicle sensor 6 and/or an electronics unit coupled to relevant vehicle sensor 6, for example, in a vehicle electronics.

System 2 may also calibrate an array of vehicle sensors, which are situated at different installation positions of vehicle 4. For this purpose, calibration object 20 is moved to different positions in order to then carry out the calibration.

FIG. 2 shows a method 24 for calibrating at least one vehicle sensor 6 situated in a vehicle 4. This includes the steps of providing 26 vehicle 4 in calibration space 8, detecting 28 a vehicle position in the fixed coordinate system with the aid of the optical detection system situated in calibration space 8, ascertaining 30 a position of relevant vehicle sensor 6 in the space-fixed coordinate system, situating 32 a calibration object 20 in a detection field of relevant vehicle sensor 6 in calibration space 8, detecting 34 a calibration object position in the space-fixed coordinate system with the aid of the optical detection system, transforming 36 the calibration object position into an estimated vehicle sensor-fixed coordinate system to obtain a first relative position, detecting 38 the position of the calibration object by way of vehicle sensor 6 in the vehicle sensor-fixed coordinate system as a second relative position, calculating 40 intrinsic and/or extrinsic calibration parameters from a comparison between the first relative position and the second relative position, and storing 42 the calibration parameters in relevant vehicle sensor 6 and/or an electronics unit coupled to relevant vehicle sensor 6.

Situating 32 calibration object 20 may include automatically moving 44 calibration object 20 into a predefined relative position in relation to relevant vehicle sensor 6. Furthermore, detecting 28 the vehicle position may include situating 46 marking elements at predetermined positions of vehicle 4, the marking elements being identifiable by the optical detection system. This may furthermore include detecting 48 contours of vehicle 4, which are identified on the basis of geometric data of vehicle 4. Detecting 38 the position of calibration object 20 by way of vehicle sensor 6 in the vehicle sensor-fixed coordinate system may furthermore include emitting 50 punctiform light signals from calibration object 20, detecting 52 the punctiform light signals, and ascertaining 54 a distance and/or direction of calibration object 20.

What is claimed is:

1. A method for calibrating at least one vehicle sensor situated in a vehicle, the method comprising the following steps:

provicing the vehicle in a calibration space;

detecting a vehicle position in a space-fixed coordinate system using an optical detection system situated in the calibration space;

ascertaining a position of a relevant vehicle sensor in the space-fixed coordinate system, the relevant vehicle sensor being the vehicle sensor to be calibrated;

situating a calibration object in a detection field of the relevant vehicle sensor in the calibration space;

detecting a calibration object position in the space-fixed coordinate system using the optical detection system;

transforming the calibration object position into an estimated vehicle sensor-fixed coordinate system to obtain a first relative position;

detecting a position of the calibration object using the relevant vehicle sensor in the vehicle sensor-fixed coordinate system as a second relative position, calculating intrinsic and/or extrinsic calibration parameters from a comparison between the first relative position and the second relative position, and storing the calibration parameters in the relevant vehicle sensor and/or in an electronics unit coupled to the relevant vehicle sensor, wherein the detecting of the position of the calibration object using the relevant vehicle sensor in the vehicle sensor-fixed coordinate system further includes emitting a punctiform light signal from the calibration object, detecting the punctiform light signal, and ascertaining a distance and/or direction of the calibration object.

2. The method as recited in claim 1, further comprising:

automatically moving the calibration object into a predefined relative position in relation to the relevant vehicle sensor.

3. The method as recited in claim 1, wherein the detecting of the vehicle position includes situating marking elements at predetermined positions of the vehicle, marking elements being identifiable by the optical detection system.

4. The method as recited in claim 1, wherein the detecting of the position includes detecting contours of the vehicle, which are identified based on geometric data of the vehicle.

5. A method for calibrating at least one vehicle sensor situated in a vehicle, the method comprising the following steps:

providing the vehicle in a calibration space;

detecting a vehicle position in a space-fixed coordinate system using an optical detection system situated in the calibration space;

ascertaining a position of a relevant vehicle sensor in the space-fixed coordinate system, the relevant vehicle sensor being the vehicle sensor to be calibrated;

situating a calibration object in a detection field of the relevant vehicle sensor in the calibration space;

detecting a calibration object position in the space-fixed coordinate system using the optical detection system;

transforming the calibration object position into an estimated vehicle sensor-fixed coordinate system to obtain a first relative position;

detecting a position of the calibration object using the relevant vehicle sensor in the vehicle sensor-fixed coordinate system as a second relative position, calculating intrinsic and/or extrinsic calibration parameters from a comparison between the first relative position and the second relative position, and storing the calibration parameters in the relevant vehicle sensor and/or in an electronics unit coupled to the relevant vehicle sensor, and after calibrating the relevant vehicle sensor, automatically moving the calibration object into a predefined relative position for at least one subsequent vehicle sensor and carrying out a calibration of the at least one subsequent vehicle sensor.

6. A system for calibrating at least one vehicle sensor situated in a vehicle, comprising:

a calibration space;

a calibration object; and a space-fixed optical detection system, situated in the calibration space, including at least one optical detection unit and a processor unit which may be coupled to the optical detection unit, wherein the calibration object includes a punctiform light source configured to emit a punctiform light signal for ascertaining a distance and/or direction of the calibration object from the vehicle sensor, and wherein the processor unit is configured to:

ascertain a vehicle position of a vehicle in a fixed coordinate system using the optical detection system situated in the calibration space, ascertain a position of a relevant vehicle sensor in the space-fixed coordinate system, the relevant vehicle sensor being the vehicle sensor to be calibrated, detect a calibration object position of the calibration object situated in a detection field of the relevant vehicle sensor in a space of an fixed coordinate system using the optical detection system, transform the calibration object position into an estimated vehicle sensor-fixed coordinate system to obtain a first relative position, compute intrinsic and/or extrinsic calibration parameters from a comparison between the first relative position and a second relative position, the second relative position being ascertained by the relevant vehicle sensor in the vehicle sensor-fixed coordinate system, and store the calibration parameters in the relevant vehicle sensor and/or in an electronics unit coupled to the relevant vehicle sensor.

7. A system for calibrating at least one vehicle sensor situated in a vehicle, comprising:

a calibration space;

a calibration object;

a space-fixed optical detection system, situated in the calibration space, including at least one optical detection unit and a processor unit which may be coupled to the optical detection unit; and a movement device configured to hold and move the calibration object at a predefined position in the calibration space, wherein the processor unit is configured to:

ascertain a vehicle position of a vehicle in a fixed coordinate system using the optical detection system situated in the calibration space, ascertain a position of a relevant vehicle sensor in the space-fixed coordinate system, the relevant vehicle sensor being the vehicle sensor to be calibrated, detect a calibration object position of the calibration object situated in a detection field of the relevant vehicle sensor in a space of an fixed coordinate system using the optical detection system, transform the calibration object position into an estimated vehicle sensor-fixed coordinate system to obtain a first relative position, compute intrinsic and/or extrinsic calibration parameters from a comparison between the first relative position and a second relative position, the second relative position being ascertained by the relevant vehicle sensor in the vehicle sensor-fixed coordinate system, and store the calibration parameters in the relevant vehicle sensor and/or in an electronics unit coupled to the relevant vehicle sensor.

8. The system as recited in claim 7, wherein the movement device includes at least one rail, at which the calibration object is held movably.

9. A method for calibrating at least one vehicle sensor situated in a vehicle, the method comprising the following steps:

providing the vehicle in a calibration space;

detecting a vehicle position in a space-fixed coordinate system using an optical detection system situated in the calibration space;

ascertaining a position of a relevant vehicle sensor in the space-fixed coordinate system, the relevant vehicle sensor being the vehicle sensor to be calibrated;

situating a calibration object in a detection field of the relevant vehicle sensor in the calibration space;

automatically moving the calibration object into a predefined position in the calibration space;

detecting a calibration object position in the space-fixed coordinate system using the optical detection system;

transforming the calibration object position into an estimated vehicle sensor-fixed coordinate system to obtain a first relative position;

detecting a position of the calibration object using the relevant vehicle sensor in the vehicle sensor-fixed coordinate system as a second relative position, calculating intrinsic and/or extrinsic calibration parameters from a comparison between the first relative position and the second relative position, and storing the calibration parameters in the relevant vehicle sensor and/or in an electronics unit coupled to the relevant vehicle sensor.

* * * * *